US006501965B1

(12) United States Patent
Lucidarme

(10) Patent No.: US 6,501,965 B1
(45) Date of Patent: Dec. 31, 2002

(54) RADIO COMMUNICATION BASE STATION ANTENNA

(75) Inventor: Thierry Lucidarme, Montigny le Bretonneux (FR)

(73) Assignee: Nortel Matra Cellular (FR)

( * ) Notice: Subject to any disclaimer, the term of this patent is extended or adjusted under 35 U.S.C. 154(b) by 0 days.

(21) Appl. No.: 09/700,550

(22) PCT Filed: May 17, 1999

(86) PCT No.: PCT/FR99/01169

§ 371 (c)(1),
(2), (4) Date: Nov. 14, 2000

(87) PCT Pub. No.: WO99/60657

PCT Pub. Date: Nov. 25, 1999

(30) Foreign Application Priority Data

May 20, 1998 (FR) ........................................... 98 06385

(51) Int. Cl.[7] ................................................ H04B 1/38

(52) U.S. Cl. ......................... 455/562; 455/561; 455/25; 343/770; 343/767; 342/359; 342/360; 342/361; 342/368

(58) Field of Search .......................... 455/562, 25, 561; 343/770, 767; 342/359, 360, 361, 368

(56) References Cited

U.S. PATENT DOCUMENTS

| | | | | |
|---|---|---|---|---|
| 5,430,455 A | * | 7/1995 | Heddebaut | 342/457 |
| 5,442,367 A | * | 8/1995 | Naito et al. | 343/700 |
| 6,252,549 B1 | * | 6/2001 | Derneryd | 343/700 |
| 6,301,238 B1 | * | 10/2001 | Hagerman et al. | 370/336 |

FOREIGN PATENT DOCUMENTS

| | | |
|---|---|---|
| EP | 0 521 326 | 1/1993 |
| EP | 0 805 508 | 11/1997 |
| GB | 2 229 319 | 9/1990 |
| WO | WO 95/23441 | 8/1995 |

OTHER PUBLICATIONS

K Ogawa, et al., <<A Beam Tilt Dipole Array Antenna for Indoor Mobile Applications>>, IEICE Transactions on Electronics, May 1, 1996, vol E79–C, No. 5, pp. 685–692.

J Hirokawa, et al., <<Analysis and Design of a Circumferential Wide Slot Cut on a Thin Cylinder for Mobile Base Station Antennas>>, Proceedings of the Antennas and Propagation Society International Symposium (APSIS), Ann Arbor, Jun. 28–Jul 2, 1993, vol. 3, Jun. 28, 1993, pp. 1842–1845.

* cited by examiner

*Primary Examiner*—William Trost
*Assistant Examiner*—Danh C Le
(74) *Attorney, Agent, or Firm*—Piper Rudnick

(57) ABSTRACT

The base station has an antenna system comprising a housing for fixing it to a support and one or several radiating slots. It is designed for transmitting, in a first direction substantially perpendicular to the front surface of the housing, an electric field with polarization oriented along a second direction substantially parallel to the front surface, and for transmitting, in another direction closer to the second than to the first direction, an electric field with polarization substantially oriented along the first direction. The base station is well adapted to indoor environments in microcells or picocells. It can be fixed vertically on a wall or be horizontally suspended to a ceiling, without requiring separate antenna systems for these two installation modes.

17 Claims, 3 Drawing Sheets

FIG.5.
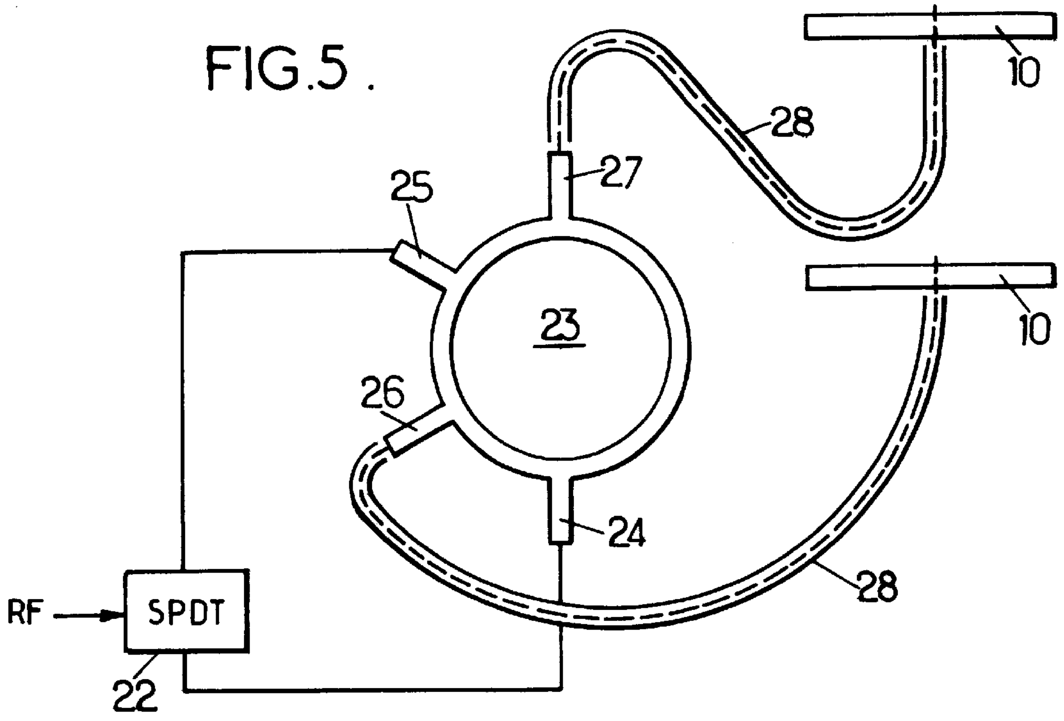
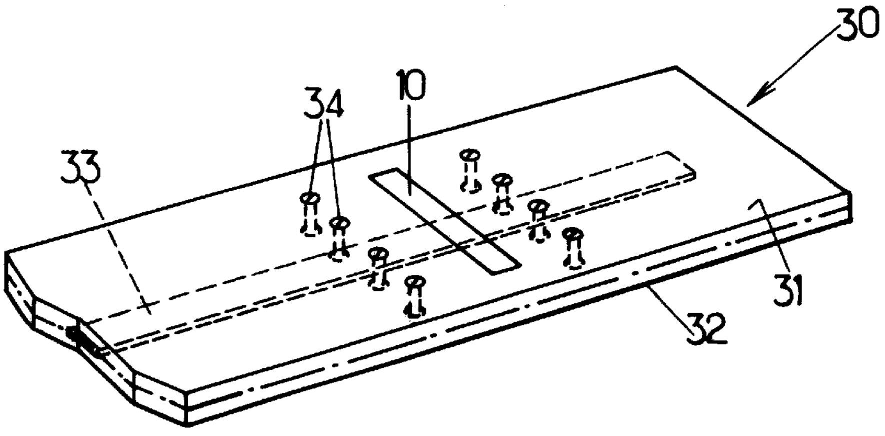
FIG.6.

RADIO COMMUNICATION BASE STATION ANTENNA

BACKGROUND OF THE INVENTION

The present invention relates to a radiocommunication base station, in particular a station for a cellular network, more particularly a station for small cells (microcells or picocells) in an indoor environment (a station for installation indoors).

The antenna systems of radiocommunication base stations are normally required to radiate a wave that is polarised vertically relative to the ground, i.e. with a vertical electrical field vector. The reason for this is that the dipoles of mobile station antennas are usually oriented around the vertical when the stations are communicating. The vertical polarisation of the wave produced by the base station therefore optimises the power picked up.

As a general rule, it is desirable to integrate the antenna system with the structure of the casing of the station to limit installation costs associated with the use of connectors, cables and remote antennas.

For indoor applications, two configurations of the base stations (or their antenna systems if these are separate from the units which handle digital processing and the interface with fixed networks) are routinely used by installers: a wall-mounted configuration and a ceiling-mounted configuration.

The antenna is often a dipole (or a monopole) which radiates a wave whose electric field is polarised parallel to the axis of the dipole. Also encountered are microstrip printed circuit antennas in which the radiation pattern is more directional. For the electric field produced to be polarised vertically in the usual two configurations (wall-mounted and ceiling-mounted), the number of antenna systems has to be doubled, which is not economical and can give rise to problems of overall size. Otherwise, two distinct architectures must be designed, one for the wall-mounted configuration and the other for the ceiling-mounted configuration, which also represents a penalty.

The documents WO 95/23441, EP-A-0 805 508, EP-A-0 521 326, "Analysis and design of a circumferential wide slot cut on a thin cylinder for mobile base station antennas" (J. Hirokawa et al., IEEE, Proceedings of APSIS, 1993, Vol.3, Jun. 28, 1993, pages 1842–1845), and the abstract of Japanese Patent Application JP-A-09 232835, disclose antennas whose radiating elements are radiating slots.

The document GB-A-2 229 319 discloses an antenna intended to be mounted in a vertical configuration and in which the radiating element is a pair of spaced parallel metal plates. It is stated that the antenna could be mounted horizontally, in a ceiling or in a floor.

An object of the present invention is to propose base stations whose antenna systems are well suited to the usual indoor installation conditions and do not require duplication.

SUMMARY OF THE INVENTION

The invention therefore proposes a radiocommunication base station including, for communicating by radio with mobile stations, at least one antenna system including a casing for fixing it to a support.

According to a first aspect of the invention, the antenna system includes at least one radiating slot formed in a conductive plane parallel to a front face of the casing and adapted to emit, in a first direction substantially perpendicular to the front face of the casing, an electric field whose polarisation is oriented in a second direction substantially parallel to said front face and perpendicular to the orientation of the slot, and to emit, in at least one other direction, substantially closer to the second direction than to the first direction, an electric field whose polarisation is oriented substantially in the first direction, the casing having a first operating position in which said second direction is substantially vertical and a second operating position in which said first direction is substantially vertical.

In the wall-mounted configuration, the antenna system is disposed so that the "first direction" is vertical. Mobile stations facing the antenna system thus receive a wave whose electric field has a relatively strong vertical component, which is what is required.

In the ceiling-mounted configuration, the front face of the casing is horizontal. Because the "other direction" is oriented towards an area to be covered, mobile stations in that area also receive a wave whose electric field has a relatively strong vertical component. It is true that the directly radiated electric field is quasi-horizontal at positions vertically aligned with the casing. However, because the mobile stations that are located there receive a relatively high power, this orientation of the electric field does not give rise to any sensitivity problem. To the contrary, radiating a quasi-horizontal electric field in the immediate vicinity of the station means that depolarisation losses limit the incidence of blocking problems, i.e. problems of saturation of receivers (see GSM Specification 05.05). These blocking problems are very serious in practice and currently give rise to very tight specifications for the linearity of receivers, which is an additional-cost factor.

According to a second aspect of the invention, the antenna system includes two parallel radiating slots oriented perpendicularly to the first and second directions and separated by a distance substantially equal to half the radiated wavelength and means for feeding radio-frequency energy to the two slots adapted to energise the two slots either in phase or in phase opposition according to whether the front face of the casing is installed in a horizontal or vertical plane.

Other features and advantages of the present invention will become apparent in the course of the following description of non-limiting embodiments of the invention, which description is given with reference to the accompanying drawings, in which:

DESCRIPTION OF THE DRAWINGS

FIG. 5 is a diagram of RF energisation means for energising a pair of radiating slots of a base station according to the invention; and FIG. 6 is a perspective view of one embodiment of energisation means for energising an individual slot.

DESCRIPTION OF PREFERRED EMBODIMENTS

Figure 1:
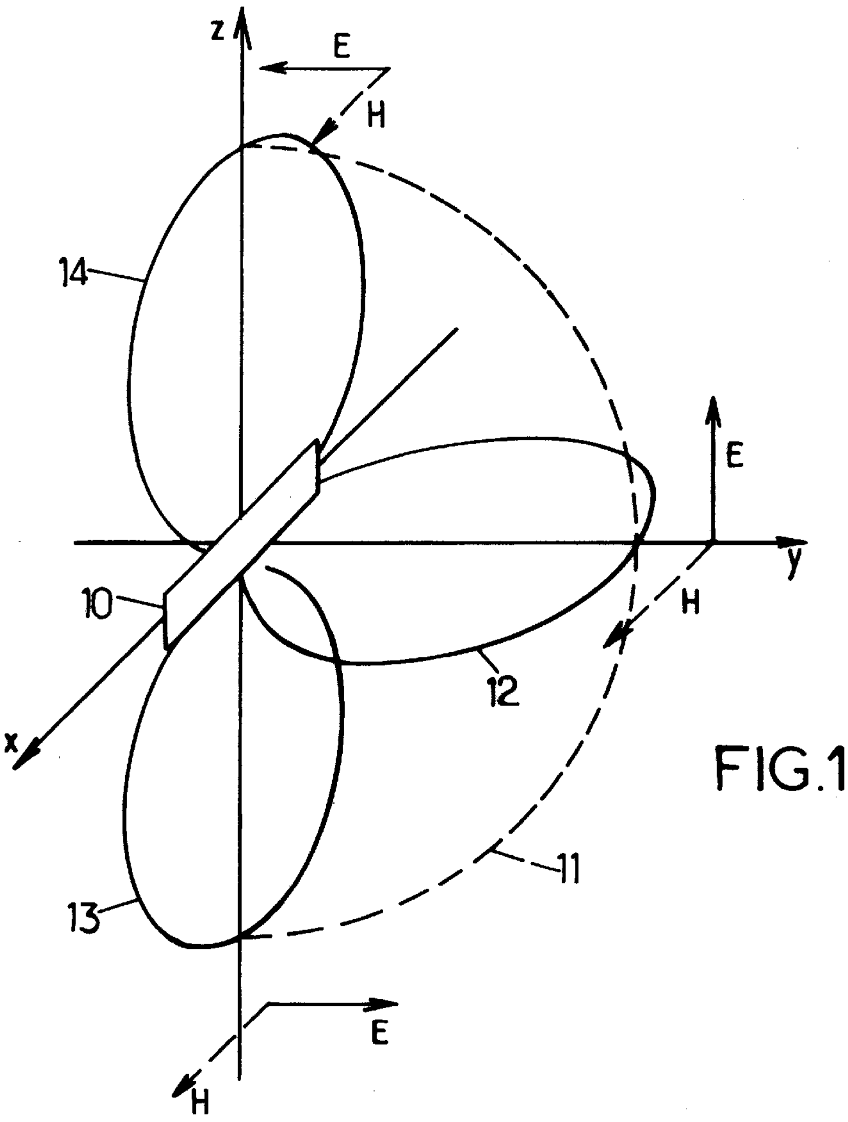
FIG. 1 is a diagram showing the radiated field in front of a slot energised with microwaves.

FIG. 1 shows the electric field E and the magnetic field H of a wave produced by a radiating slot 10 formed in a plane xOz. Ox is the longitudinal direction of the slot and Oy is the direction perpendicular to the plane xOz. The slot 10 is energised with radio-frequency energy from its rear face by means of a conductor parallel to the axis Oz. Typical dimensions of the slot are a length of the order of $\lambda/2$ (along the axis Oz) and a width of $\lambda/10$ (along the axis Oz), where $\lambda$ is the wavelength of the radiated wave.

A radiating slot 10 of the above kind formed in an infinite conductive plate has a radiation diagram that is the dual of that of the electrical dipole. The present invention exploits the property of a slot of the above kind whereby the direction electrical of the field E varies in the plane yOz perpendicular to the longitudinal axis Ox of the slot.

Thus, in the direction Oy perpendicular to the plane of the slot 10, the electric field vector E lies in the direction Oz parallel to the plane of the slot and in planes near the plane of the slot xOz the electric field vector E is perpendicular to the plane of the slot (parallel to Oy). Along a semicircle 11 centred on the axis Ox (shown in dashed outline in FIG. 1), the magnetic field vector H remains constant and the electric field vector E performs a half-turn.

The curve 12 shown in FIG. 1 in the plane xoy is an iso-E curve in the plane xOy along which the electric field vector E is constant (parallel to Oz). The curves 13 and 14 are iso-E curves situated immediately in front of the plane xOz (electric field E parallel to Oy).

In accordance with the invention, a radiating slot 10 of the above kind is provided on the front face 16 of the casing 15 of a cellular radiocommunication base station for use in an indoor environment.

The real radiation diagram of the slot depends on the dimensions of the conductive plane in which it is formed. In practice, a slot of the above kind with typical dimensions of $\lambda/2$, $\lambda/10$ formed in a ground plane whose rectangular dimensions are typical of this application to a radiocommunication base station (i.e. a few tens of centimeters) produces a quasi-hemispherical radiation diagram.

Figure 2:
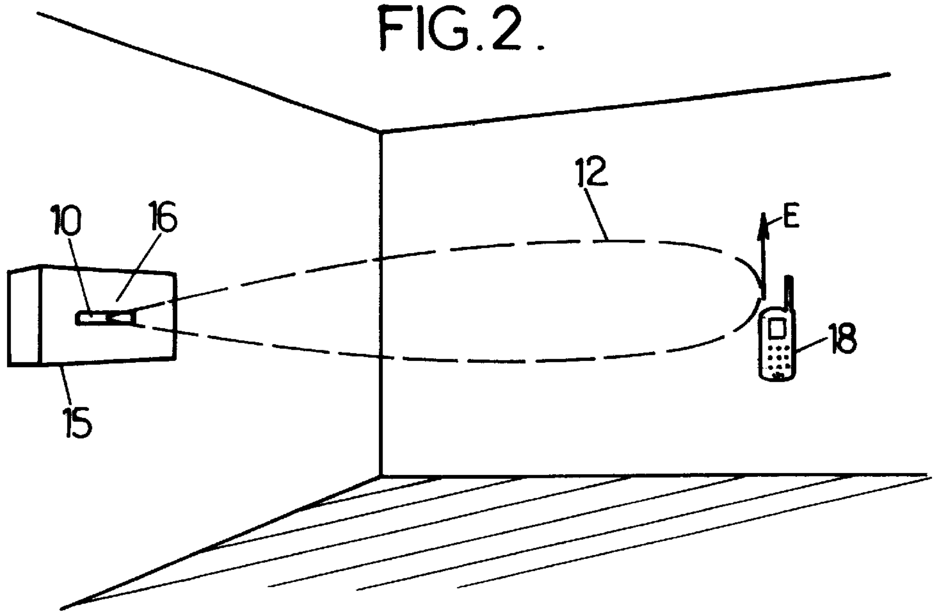
FIG. 2 is a perspective view of a base station according to the invention in a wall-mounted configuration.

FIG. 2 shows the base station fixed to a wall. The front face 16 of its casing 15 is vertical, parallel to the wall, and the longitudinal axis Ox of the slot 10 is therefore horizontal.

Thus, in the horizontal plane xOy passing through the slot 10, the radiated electric field E is substantially vertical (the iso-E curve 12 in FIG. 1, which lies in a horizontal plane, is shown in dashed outline in FIG. 2). Consequently, mobile stations 18 operating in the premises served by the base station receive an electric field E close to the vertical, which optimises sensitivity. If the antennas of the mobile stations 18 are not exactly in the plane xOy, they are nevertheless relatively close to that plane, either above it or below it, and the received electric field E therefore remains fairly close to the vertical because its direction changes only gradually along the circular arc 11 shown in FIG. 1.

Figure 3:
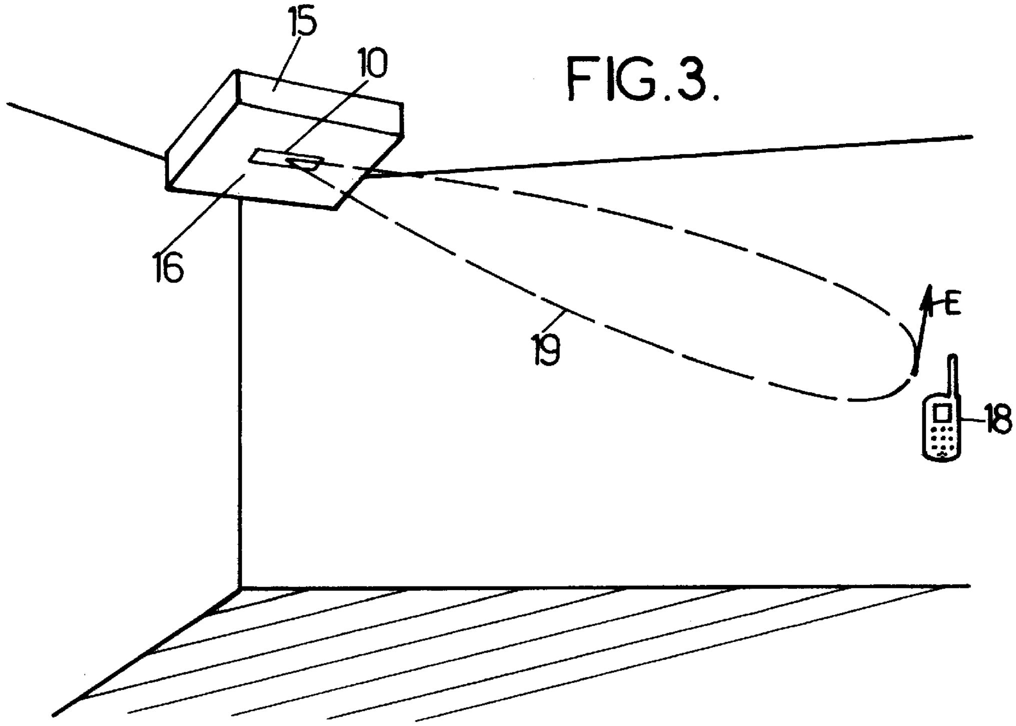
FIG. 3 is a perspective view of a base station according to the invention in a ceiling-mounted configuration.

FIG. 3 shows the base station suspended from the ceiling with its front face 16 horizontal.

The casing 15 can be placed close to a corner of the ceiling, as shown, with the direction Oz pointing approximately along the bisector of the corner. With this configuration, mobile stations 18 in the premises served also receive an electric field E which is approximately vertical. In other words, the iso-E curves 19 passing through the most probable locations of mobile stations are much closer to the curves 13 and 14 shown in FIG. 1 than the curve 12. From the front face 16 of the base station, the mobiles 18 are seen at virtually grazing incidence, which provides the property of the electric field that the invention exploits.

This latter property is not respected at points vertically aligned with the base station, at which the electric field received on a direct line of sight is virtually horizontal. However, these points are very close to the base station and therefore pick up a strong field. It is better for the electric field to be depolarised in this area, because of the blocking problems previously referred to.

FIGS. 2 and 3 show that the same base station, whose antenna system consists of a simple radiating slot 10 formed in the front face 16 of its casing 15, can be used and achieve the required orientation of the radiated electric field in a wall-mounted or ceiling-mounted configuration, without any other particular measures being needed.

Note that, in the ceiling-mounted configuration shown in FIG. 3, the base station whose antenna system consists of a single radiating slot initially broadcasts a relatively high level of radio frequency energy under the station. To limit this effect, the antenna system advantageously consists of two parallel slots in the front face 16 of the casing 15 separated by a distance $\lambda/2$ equal to half the radiated wavelength.

In the ceiling-mounted configuration, the array formed by the two parallel slots is energised in phase opposition so that, if the array consists of isotropic sources, it radiates a maximum field in the plane containing the two slots (this array configuration is referred to as an endfire configuration).

In the wall-mounted configuration, the array is energised in phase so that, if the array consists of isotropic sources, it radiates a maximum field in the median plane between the two slots (this array configuration is referred to as a broadside configuration).

Figure 4:
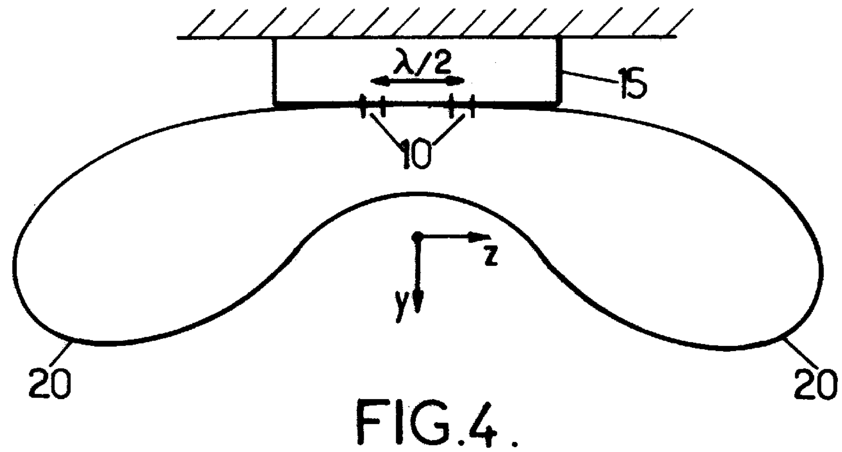
FIG. 4 is a radiation diagram of a pair of parallel slots spaced by $\lambda/2$ in a plane perpendicular to the slots.

A ceiling-mounted configuration of the above kind is shown diagrammatically in FIG. 4. The energy radiated by the system of two slots 10 spaced by $\lambda/2$ and energised in phase opposition forms two lobes 20 which are symmetrical about the median plane of the slots. Interference between waves radiated by the two slots greatly reduces the energy radiated near the median plane. This greatly reduces the horizontal component of the electric field radiated unnecessarily at points vertically aligned with the antenna system when the latter consists of a single slot.

An antenna system with two slots 10 can be energised with radio-frequency energy by the means shown diagrammatically in FIG. 5.

The RF power to be radiated is supplied to the input of a hybrid switch 22 whose two outputs are connected by conductors of the same electrical length to two inputs 24, 25 of a hybrid coupler 23. The switch 22 delivers the radio-frequency energy either to the input 25 or to the input 24 of the coupler, according to an external command depending on the configuration in which the station is installed (wall-mounted or ceiling-mounted). An R&K SWD-1 single-pole/double-throw (SPDT) switch is one example of a hybrid switch that can be used for this purpose.

The hybrid coupler 23 has four ports 24–27 and can be of the rat-race type (see "Lumped-element networks compose wide-bandwidth balun", Microwaves & RF, September 1993, page 119). A rat-race coupler includes a conductive patch separated from a ground plane by a dielectric layer, the patch taking the form of a circle of diameter $3\lambda/2\pi$ along which the four ports are distributed: the second, third and fourth ports are respectively at 60°, 120° and 180° to the first port. The first port 24 and the third port 25 at 120° to it are connected to the two outputs of the switch 22. The second and fourth ports 26, 27 at 60° and 180° energise the respective slots 10, for example via identical coaxial cables 28. Each coaxial cable 28 has its shield connected to the ground plane of the coupler 23, and its core connected to the port 26, 27 transmits energy to the slot 10.

In the FIG. 5 configuration, the switch 22 delivers RF power to the port 25 of the coupler 23 when the base station is installed in a wall-mounted configuration. The two slots are then energised in phase and the energy radiated is maximised in the required direction (the median plane between the two slots) with the electric field vertical. This improves directivity by approximately 3 dB.

In a ceiling-mounted configuration, the switch 22 delivers RF power to the port 24 and the two slots 10 are energised in phase opposition, which produces the interference explained with reference to FIG. 4.

FIG. 6 shows a hybrid component 30 that can be used as an antenna in a base station according to the invention. There is only one radiating slot 10 in the FIG. 10 diagram, but clearly that diagram can be repeated in the case of multiple radiating slots.

The component 30 is a triplate component and includes two metallised planes 31, 32 with a dielectric sandwiched between them. The two planes 31, 32 are grounded. The radiating slot 10 is etched in the ground plane 31 that faces outwards and the other ground plane 32 is uninterrupted. There is a conductive line 33 in the dielectric between the ground planes 31, 32. Radio-frequency energy is supplied over this line 33 (in the FIG. 5 diagram, the line 33 is connected to the port 26 or 27 of the coupler 23). In the vicinity of the slot 10, the conductive line 33 is perpendicular to the slot. The impedance of the slotted antenna is varied by adjusting the position along the longitudinal direction x of the slot 10 of the point where the line 33 crosses the slot 10. Around the slot a few plated-through holes 34 passing through the dielectric connect the two ground planes 31, 32 to prevent radiation from the sides of the component and feedback of energy towards the generator. Triplate components 30 like that shown in FIG. 6 have the advantage of enabling a compact and inexpensive implementation of the antenna system and its energisation system. A component 30 of the above kind can be placed on the front face of the casing 15 to radiate waves having the properties previously explained.

In the foregoing explanations, the whole of the base station of the microcell or picocell is installed either in a wall-mounted configuration or in a ceiling-mounted configuration (FIGS. 2 and 3).

Of course, if the base station has a main unit (handling baseband processing and the interface with fixed networks) separate from the antenna system(s) used to serve a cell or several sectors from that base station, each antenna system can be wall-mounted or ceiling-mounted, as previously explained. In this case, the casing 15 with the slotted antenna can contain a duplexer, a transmit power amplifier, a low-noise receive amplifier, and possibly various filters, modulators and demodulators. The connection between the main unit of the station and a casing 15 of this kind can be a coaxial cable if it carries radio-frequency signals or a simple twisted pair if it carries baseband signals.

What is claimed is:

1. A radiocommunication base station including, for communicating by radio with mobile stations, at least one antenna system including a casing for fixing said antenna system to a support and at least one radiating slot formed in a conductive plane parallel to a front face of the casing and adapted to emit, in a first direction substantially perpendicular to the front face of the casing, an electric field having a polarisation oriented in a second direction substantially parallel to said front face and perpendicular to an orientation of the slot, and to emit, substantially in the second direction, an electric field having a polarisation oriented substantially in the first direction, the casing having a first operating position in which said second direction is substantially vertical and a second operating position in which said first direction is substantially vertical.

2. A base station according to claim 1, wherein each radiating slot of the antenna system is formed in a part of the casing extending along the front face thereof.

3. A base station according to claim 1, wherein the antenna system has a single radiating slot oriented perpendicularly to the first and second directions.

4. A base station according to claim 1, wherein the antenna system includes two parallel radiating slots oriented perpendicularly to the first and second directions and separated by a distance substantially equal to half of a radiated wavelength and means for feeding radio-frequency energy to the two slots adapted to energise the two slots either in phase or in phase opposition according to whether the front face of the casing is installed in a horizontal or vertical plane.

5. A base station according to claim 4, wherein the feeding means include a hybrid coupler having four ports, a dual RF switch having an input receiving radio-frequency energy to be radiated and two outputs connected to respective ports of the hybrid coupler, and two energisation systems respectively connecting the other two ports of the hybrid coupler to the two radiating slots.

6. A base station according to claim 5, wherein the hybrid coupler is a rat-race hybrid coupler.

7. A base station according to claim 5, wherein the two energisation systems are coaxial or triplate energisation systems.

8. A base station according to claim 1, wherein a triplate printed circuit is disposed along the front face of the casing and includes two grounded external conductive planes, one of said conductive planes, directed towards the outside of the casing being etched to form each radiating slot, a line for energising each slot being situated between the two external conductive planes.

9. A radiocommunication base station including, for communicating by radio with mobile stations, at least one antenna system including a casing for fixing said antenna system to a support, two parallel radiating slots formed in a conductive plane parallel to a front face of the casing separated by a distance substantially equal to half of a radiated wavelength and means for feedign radio-frequency energy to the two slots adapted to energise the two slots either in phase or in phase opposition according to whether the front face of the casing is installed in a horizontal or vertical plane.

10. A base station according to claim 9, wherein the radiating slots are formed in a part of the casing extending along the front face thereof.

11. A base station according to claim 9, wherein the feeding means include a hybrid coupler having four ports, a dual RF switch having an input receiving radio-frequency energy to be and two outputs connected to respective ports of the hybrid coupler, and two energisation systems respectively connecting the other two ports of the hybrid coupler to the tow radiating slots.

12. A base station according to claim 11, wherein the hybrid coupler is a rat-race hybrid coupler.

13. A base station according to claim 11, wherein the two energisation systems are coaxial or triplate energisation systems.

14. A base station according to claim 9, wherein a triplate printed circuit is disposed along the front face of the casing and includes two grounded external conductive planes, one of said conductive planes, directed towards the outside of the casing being etched to form each radiating slot, a line for energising each slot being situated between the tow external conductive planes.

15. A method of installing a radiocommunication base station including, for communicating by radio with mobile stations, at least one antenna system including a casing for fixing said antenna system to a support, said antenna system including at least one radiating slot formed in a conductive plane parallel to a front face of the casing, the disposition of the slot defining a first direction substantially perpendicular to the front face of the casing and a second direction substantially parallel to said front face and perpendicular to the orientation of the slot, said first and second directions being such that the slot emits in the first direction an electric field having a polarisation oriented in the second direction and emits, substantially in the second direction, an electric field having a polarisation oriented substantially in the first direction, in which method at least one first antenna system is fixed to a support so that, for said first antenna system, said second direction is substantially vertical, and at least one second antenna system is fixed to a support so that, for said second antenna system, said first direction is substantially vertical.

16. A method according to claim 15, wherein each radiating slot of the antenna system is formed in a part of the casing extending along the front face thereof.

17. A method according to claim 15, wherein each antenna system includes a single radiating slot oriented perpendicularly to the first and second directions.

* * * * *